(12) United States Patent
Rasch et al.

(10) Patent No.: US 11,867,251 B2
(45) Date of Patent: Jan. 9, 2024

(54) PULLEY DECOUPLER HAVING A CENTRIFUGAL PENDULUM DEVICE WITH A FIRST FRICTION DEVICE

(71) Applicant: Schaeffler Technologies AG & Co. KG, Herzogenaurach (DE)

(72) Inventors: Philipp Rasch, Forst (DE); Jean Sieffert, Lingolsheim (FR); Daniel Heinrich, Bühl (DE); Hartmut Mende, Bühl (DE); Andreas Stuffer, Weingarten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 730 days.

(21) Appl. No.: 16/971,212

(22) PCT Filed: Feb. 14, 2019

(86) PCT No.: PCT/DE2019/100144
§ 371 (c)(1),
(2) Date: Aug. 19, 2020

(87) PCT Pub. No.: WO2019/161840
PCT Pub. Date: Aug. 29, 2019

(65) Prior Publication Data
US 2021/0088106 A1   Mar. 25, 2021

(30) Foreign Application Priority Data
Feb. 23, 2018   (DE) .......................... 102018104135.7

(51) Int. Cl.
*F16F 15/14* (2006.01)
*F16D 3/12* (2006.01)
(Continued)

(52) U.S. Cl.
CPC .............. *F16F 15/145* (2013.01); *F16D 3/12* (2013.01); *F16F 15/123* (2013.01); *F16H 55/36* (2013.01);
(Continued)

(58) Field of Classification Search
CPC .... F16F 15/145; F16F 15/123; F16F 2222/04; F16F 15/12373; F16D 3/12; F16H 55/36;
(Continued)

(56) References Cited

U.S. PATENT DOCUMENTS 5,413,535 A * 5/1995 Reik .................. F16H 7/16
74/574.2
2003/0100376 A1   5/2003 Friedmann et al.
(Continued)

FOREIGN PATENT DOCUMENTS

| CN | 1208138 A | 2/1999 |
|---|---|---|
| CN | 104620019 A | 5/2015 |

(Continued)

OTHER PUBLICATIONS

Machine translation of WO 2016012023 A1, Maienschein et al., Jan. 28, 2016 (Year: 2016).*

(Continued)

*Primary Examiner* — Vinh Luong

(57) ABSTRACT

A pulley decoupler for an accessory drive comprises input and output parts.

The output part and the input part are rotatable about a common axis of rotation and are rotatable to a limited extent relative to one another.

A centrifugal pendulum device is provided for damping torsional vibrations with a centrifugal pendulum flange that can be rotated about the axis of rotation and has at least one pendulum mass displaceable under centrifugal force relative to the centrifugal pendulum flange. The at least one pendu- (Continued)

lum mass is acted on by a friction force generated by a first friction device having a first spring and at least one first friction element.

20 Claims, 1 Drawing Sheet

(51) Int. Cl.
*F16F 15/123* (2006.01)
*F16H 55/36* (2006.01)

(52) U.S. Cl.
CPC .... *F16F 2222/04* (2013.01); *F16H 2055/366* (2013.01)

(58) Field of Classification Search
CPC ............... F16H 2055/366; F16H 45/02; F16H 2045/0226; F16H 2045/0263
USPC ........................................................ 74/574.2
See application file for complete search history.

(56) References Cited

U.S. PATENT DOCUMENTS

| 2009/0188463 | A1* | 7/2009 | Wright ................. F16F 15/145 |
| | | | 123/192.2 |
| 2011/0192692 | A1 | 8/2011 | Werner et al. |
| 2012/0180473 | A1* | 7/2012 | Huegel ............ F16F 15/12373 |
| | | | 60/435 |
| 2015/0152940 | A1 | 6/2015 | Krause et al. |
| 2015/0316125 | A1* | 11/2015 | Maienschein ......... F16F 15/145 |
| | | | 74/574.2 |
| 2017/0254398 | A1* | 9/2017 | Watanabe ........... F16F 15/1457 |
| 2023/0235811 | A1* | 7/2023 | Girnus .................. F16F 15/145 |
| | | | 74/574.2 |

FOREIGN PATENT DOCUMENTS

| CN | 106337898 A | 1/2017 | |
| CN | 105229335 B | 5/2017 | |
| DE | 19840664 A1 | 3/1999 | |
| DE | 10013699 C1 | 8/2001 | |
| DE | 3448586 B4 | 5/2006 | |
| DE | 19652730 B4 | 8/2007 | |
| DE | 102011083168 A1 | 3/2013 | |
| DE | 102013206444 A1 | 10/2013 | |
| DE | 102015205247 A1 | 10/2015 | |
| DE | 102014211711 A1 | 12/2015 | |
| DE | 102015210200 A1 | 12/2015 | |
| DE | 102014214765 A1 | 1/2016 | |
| DE | 102014217459 A1 | 3/2016 | |
| DE | 102017124023 A1 | 4/2019 | |
| GB | 2374396 A | 10/2002 | |
| WO | 2011076176 A2 | 6/2011 | |
| WO | WO 2016012023 A1 * | 1/2016 | .............. F16F 15/14 |
| WO | WO 2016131457 A1 * | 8/2016 | ............ F16F 15/121 |

OTHER PUBLICATIONS

Machine translation of WO 2016131457 A1, Burst et al., Aug. 25, 2016 (Year: 2016).*
First Office Action, The State Intellectual Property Office of People's Republic of China, Appl. No. 201980009211.2, dated May 8, 2021. (Year: 2021).*

* cited by examiner

PULLEY DECOUPLER HAVING A CENTRIFUGAL PENDULUM DEVICE WITH A FIRST FRICTION DEVICE

CROSS-REFERENCE TO RELATED APPLICATIONS

This application is the U.S. National Phase of PCT Appln. No. PCT/DE2019/100144 filed Feb. 14, 2019, which claims priority to DE 10 2018 104 135.7 filed Feb. 23, 2018, the entire disclosures of which are incorporated by reference herein.

TECHNICAL FIELD

The present disclosure relates to a pulley decoupler for an accessory drive, in particular of an internal combustion engine of a motor vehicle. In particular, a traction means of the accessory drive can be driven by means of the pulley decoupler.

BACKGROUND

Such pulley decouplers regularly have a damping device with at least one spring accumulator, which serves to reduce torsional vibrations and is arranged between an input part and an output part of the pulley decoupler. To further reduce the torsional vibrations, pulley decouplers can also have a centrifugal pendulum device with at least one pendulum mass which can be displaced under the influence of centrifugal force. The at least one pendulum mass oscillates in the opposite direction to the torsional vibrations to be eliminated and damps and/or eliminates vibrational energy or vibrational amplitude of the torsional vibrations. Due to the vibration of the at least one pendulum mass, energy can be extracted from the accessory drive in a phase-selective manner and supplied again so that accessories can be driven more uniformly by the accessory drive. During vibration, the at least one pendulum mass can strike a stop that limits a maximum oscillation angle of the at least one pendulum mass, as a result of which undesirable noises occur.

SUMMARY

The object of the disclosure is therefore to at least partially solve the problems described with reference to the prior art and in particular to provide a pulley decoupler which can be operated at a particularly low noise level.

This object is achieved by a pulley decoupler according to the features of the claims. Further advantageous embodiments of the pulley decoupler are described herein. It should be pointed out that the features listed individually in the claims can be combined with one another in any technologically expedient manner and define further refinements of the disclosure. In addition, the features indicated in the claims are specified and explained in more detail in the description, wherein further preferred embodiments of the disclosure are illustrated.

A pulley decoupler for an accessory drive contributes hereto and has at least the following components:
 an input part;
 an output part, the output part and the input part being rotatable about a common axis of rotation and rotatable to a limited extent relative to one another; and
 a centrifugal pendulum device for damping torsional vibrations having a centrifugal pendulum flange which can be rotated about the axis of rotation and which has at least one pendulum mass which can be displaced under the action of centrifugal force relative to the centrifugal pendulum flange, the at least one pendulum mass being acted upon by a friction force which is produced by a first friction device having a first spring and at least one first friction element.

A pulley decoupler can be a driving wheel of an accessory drive or a driven wheel of an accessory drive. Such an accessory drive is used in particular to drive at least one accessory unit of a drive motor or motor vehicle. An accessory unit can be an auxiliary machine of the motor vehicle that does not contribute to its motion, at least not directly. The pulley decoupler can in particular transmit a torque of the drive motor to the at least one accessory unit via at least one traction means. For this purpose, an input part of the pulley decoupler can be coupled to the drive motor in such a way that the input part can be driven by the drive motor about an axis of rotation. For this purpose, the input part can comprise a hub which can be connected to a shaft of the drive motor for conjoint rotation. The shaft can be, for example, a crankshaft, balancer shaft, intermediate shaft, or camshaft. The input part is coupled to an output part so that the output part can be rotated about the axis of rotation with the input part. The output part has a traction means running surface for the at least one traction means. The traction means running surface is in particular formed on a circumferential surface of a pulley of the output part so that a rotary movement of the output part can be transmitted to the at least one traction means. The designations input part and output part refer to a torque flow direction in which the pulley decoupler is a driving wheel that can be driven by the drive motor, which can be an internal combustion engine or an electric motor, for example. However, the pulley decoupler can also be a wheel driven by the traction means, which drives an accessory unit.

A spring device with at least one energy store can be effective between the input part and the output part, so that the output part and the input part can be rotated relative to one another to a limited extent. The spring device can be supported on the input part and the output part and/or can have at least one compression spring. The spring device can comprise at least one spiral spring and/or at least one arc spring. The spring device can rotate the input part and the output part relative to one another against a force of the spring device. Rotational vibrations or torsional vibrations can be damped and/or eliminated by the spring device.

For further damping or elimination of the rotational vibrations or torsional vibrations, the pulley decoupler has a centrifugal pendulum device. The centrifugal pendulum device has a centrifugal pendulum flange which is rotatable about the axis of rotation and has at least one pendulum mass which can be displaced under the action of centrifugal force with respect to the centrifugal pendulum flange. Furthermore, the centrifugal pendulum flange can have at least two pendulum masses. For example, the centrifugal pendulum flange can have two, three, or four pendulum masses. The at least one pendulum mass can be displaceable along a predetermined path. In addition, the at least one pendulum mass can be displaceable between a first end position and a second end position. The centrifugal pendulum device can be used for speed-adaptive damping and/or elimination of the rotational vibrations or torsional vibrations.

The centrifugal pendulum device can be arranged on the input part or the output part. In this way, in each case adapted to the application, an improvement of the damping and/or elimination of the rotational vibrations or torsional vibrations is possible. Furthermore, installation space optimization adapted to the application is possible.

The at least one pendulum mass can be made in several parts, wherein pendulum mass parts can be arranged on both sides of the centrifugal pendulum flange. In particular, the pendulum mass parts can be arranged on both sides of the centrifugal pendulum flange in the direction of the axis of rotation. The at least one pendulum mass can be supported on the centrifugal pendulum flange by means of pendulum rollers. For this purpose, the centrifugal pendulum flange can have openings for receiving the pendulum rollers. The at least one pendulum mass can have openings for receiving the pendulum rollers.

The centrifugal pendulum device can be encapsulated. This protects the centrifugal pendulum device from contamination, for example. Furthermore, the centrifugal pendulum device can be enclosed laterally and/or radially on the outside in the form of a housing. In addition, the centrifugal pendulum device can be enclosed by the input part and/or the output part. Furthermore, the centrifugal pendulum device can be enclosed by a housing part. This provides burst protection so that damage caused by a defect in the centrifugal pendulum device can be prevented. The centrifugal pendulum device can be arranged radially within the traction means running surface. The traction means running surface can be cylindrical and/or can have a larger diameter than the centrifugal pendulum device. The traction means running surface can have a width at least approximately corresponding to the centrifugal pendulum device. Furthermore, the traction means running surface can be designed in the form of a running surface for a V-ribbed belt. A particularly compact design is thus achieved.

The at least one pendulum mass is acted on by a frictional force which is generated by a first friction device with a first spring and at least one first friction element. The at least one first friction element is acted upon directly or indirectly by the first spring, which can be, for example, annular and/or in the form of a plate spring, with a force such that the at least one first friction element is pressed against the at least one pendulum mass. The at least one first friction element can be annular and/or at least partially made of plastic, such as polyamide or polyacetal. Furthermore, the at least one first friction element can be produced by an injection molding process. When the at least one pendulum mass is displaced, a frictional force arises between the at least one pendulum mass and the at least one first friction element, which brakes movement of the at least one pendulum mass. The friction force thus prevents the at least one pendulum mass from striking a stop which limits a maximum oscillation angle of the at least one pendulum mass during operation of the pulley decoupler, so that undesirable noise generation is avoided.

The first spring can be supported on a cover of a pulley of the output part.

Furthermore, the first friction element can be guided in a receptacle in the cover parallel to the axis of rotation. For this purpose, for example, a cover of the pulley can have at least one receptacle, for example in the form of an opening, for receiving the at least one first friction element.

At least one second friction element can be arranged between the at least one pendulum mass and the centrifugal pendulum flange. The at least one second friction element can be annular and/or at least partially made of plastic, such as polyamide or polyacetal. Furthermore, the at least one second friction element can be produced by an injection molding process.

Furthermore, the centrifugal pendulum flange can be arranged between a spring flange of the input part and a hub of the pulley decoupler. In particular, the centrifugal pendulum flange is clamped between the spring flange of the input part and the hub and/or the centrifugal pendulum flange is screwed to the spring flange of the input part and the hub. The centrifugal pendulum flange is therefore not rotatable relative to the spring flange of the input part and the hub. The spring flange is in particular part of the spring device. In addition, the at least one energy store is supported in particular on the spring flange so that the torque can be transmitted to the output part of the pulley decoupler via the hub, the spring flange, and the at least one energy store.

The centrifugal pendulum device can be at least partially covered by a first cover cap which is attached to a pulley of the output part. In particular, the first cover cap can be pressed into the pulley and/or serve as burst protection.

The output part can have a belt pulley which at least partially surrounds the centrifugal pendulum device. Thus the pulley can serve as burst protection.

The at least one pendulum mass can be arranged in a centrifugal pendulum space of the centrifugal pendulum device, the centrifugal pendulum space being at least partially closed by a second cover cap. The second cover cap can in particular be pressed into the first cover cap.

The second cover cap can be connected to a second friction device, so that the second cover cap generates an axial force on the pulley decoupler. The second friction device can have a second spring, for example in the form of a plate spring, a third friction element and/or a fourth friction element. The first spring and the second spring, in particular, jointly generate an axial force on the pulley decoupler. The second friction device can in particular be supported on the collar on a circumferential collar parallel to the axis of rotation.

The second cover cap can be designed as a plate spring so that the second cover cap generates an axial force on the pulley decoupler.

BRIEF DESCRIPTION OF THE DRAWINGS

The disclosure and the technical environment are explained in more detail below with reference to the figures. It should be pointed out that the figures show particularly preferred variants of the disclosure, but the disclosure is not restricted to them. Like components are provided with the same reference numerals in the figures. Exemplarily and schematically, they show.

DETAILED DESCRIPTION

Figure 1:
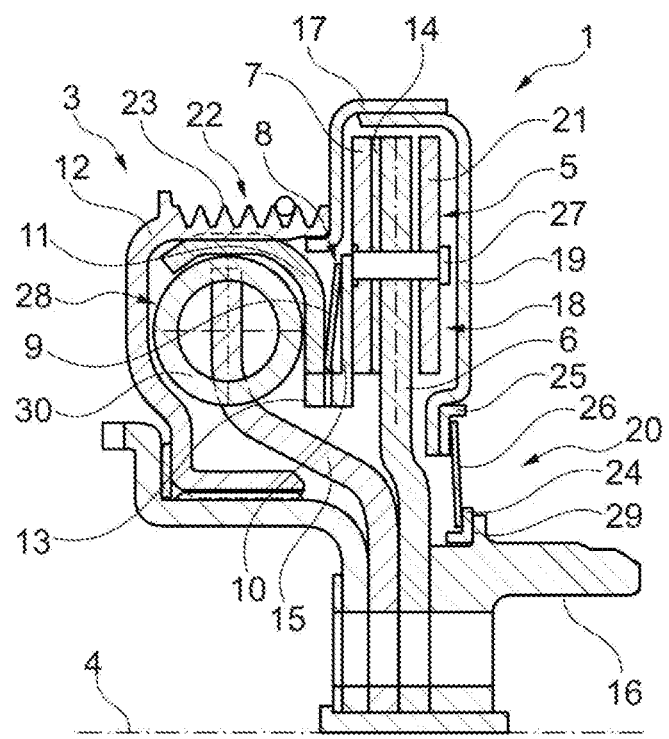
FIG. 1: a first variant of a pulley decoupler.

FIG. 1 shows a first variant of a pulley decoupler 1 in a longitudinal section. The pulley decoupler 1 has an input part 2 with a hub 16, a centrifugal pendulum flange 6, a centrifugal pendulum device 5 and a spring flange 15. The hub 16, the centrifugal pendulum flange 6 and the flange 15 are arranged for conjoint rotation and can be rotated together about an axis of rotation 4 by a motor vehicle drive motor, not shown here. The pulley decoupler 1 also has an output part 3 with a pulley 12. A traction means running surface 22 for a traction means, not shown here, is formed on an outer circumferential surface 23 of the pulley 12. Between the input part 2 and the output part 3, a damping device 28 is provided with a plurality of energy stores 30 distributed in a circumferential direction, the energy stores 30 here being designed in the form of arc springs. The energy stores 30 are supported on the one hand on the spring flange 15 and on the other hand on the pulley 12 or a cover 11 of the pulley 12, so that the input part 2 and the output part 3 can be rotated relative to one another to a limited extent against a spring force of the energy stores 30. The cover 11 is pressed into the pulley 12 so that it cannot rotate relative to the pulley 12.

Furthermore, the cover 11 has in a radial section a receptacle 13, in which a first friction element 10 of a first friction device 8 is guided parallel to the axis of rotation 4. The first friction device 8 also comprises a first spring 9, which is designed here in the form of an annular plate spring. The first spring 9 is supported on the radial section of the cover 11 and presses the first friction element 10 in an axial direction, i.e. parallel to the axis of rotation 4, against a first pendulum mass 7 which is displaceable under centrifugal force relative to the centrifugal pendulum flange 6. A second friction element 14 is arranged between the first pendulum mass 7 and the centrifugal pendulum flange 6. When the first pendulum mass 7 is displaced, the first friction device 8 thus generates a friction force by means of which movement of the first pendulum mass 7 is braked. Furthermore, a second pendulum mass 21 which is displaceable under centrifugal force relative to the centrifugal pendulum flange 6, is arranged on an opposite side of the centrifugal pendulum flange 6. The first pendulum mass 7, the second friction element 14 and the second pendulum mass 21 are held in a centrifugal pendulum space 18 by means of pendulum rollers 27 on the centrifugal pendulum flange 6. The centrifugal pendulum space 18 is partially limited by a first cover cap 17 pressed into the first pulley 12 and a second cover cap 19 pressed into the first cover cap 17. The second cover cap 19 is acted on by an axial force from a second friction device 20. For this purpose, the second friction device 20 has a second spring 26, which is designed here in the form of an annular plate spring and on the one hand is supported on a third friction element 24, which is held in the axial direction by a circumferential collar 29 of the hub 16, and on the other is supported on a fourth friction element 25 of the second cap 19.

Figure 2:
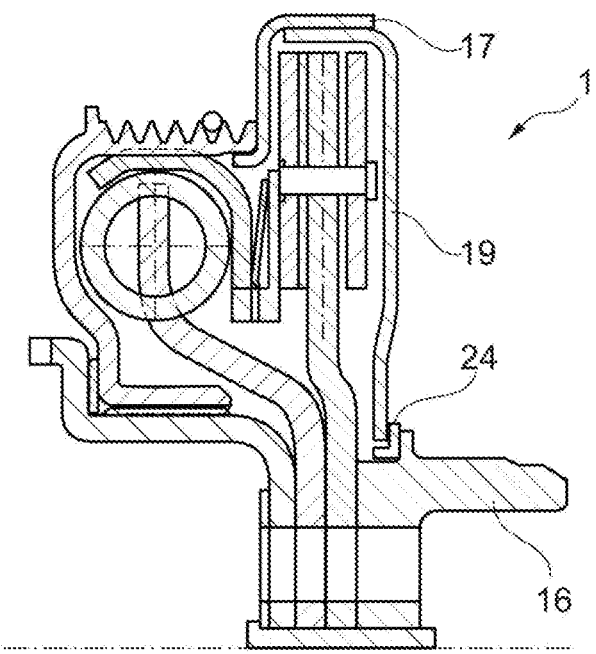
FIG. 2: a second variant of a pulley decoupler.

FIG. 2 shows a second variant of a pulley decoupler 1 in a longitudinal section, which differs from the first variant of the pulley decoupler 1 shown in FIG. 1 only in that the second cover cap 19 pressed into the first cover cap 17 itself functions as a plate spring and when installed directly generates an axial force on the pulley decoupler 1 by pressing on the third friction element 24 of the hub 16.

With the present disclosure, a pulley decoupler may be operated at a particularly low noise level.

LIST OF REFERENCE NUMBERS 1 pulley decoupler
2 input part
3 output part
4 axis of rotation
5 centrifugal pendulum device
6 centrifugal pendulum flange
7 first pendulum mass
8 first friction device
9 first spring
10 first friction element
11 cover
12 pulley
13 receptacle
14 second friction element
15 spring flange
16 hub
17 first cover cap
18 centrifugal pendulum space
19 second cover cap
20 second friction device
21 second pendulum mass
22 traction means surface
23 circumferential surface
24 third friction element
25 fourth friction element
26 second spring
27 pendulum roller
28 damping device
29 collar
30 energy storage

The invention claimed is:

1. A pulley decoupler for an accessory drive, comprising:
an input part;
an output part, the output part and the input part being rotatable about a common axis of rotation and being rotatable to a limited extent relative to one another; and
a centrifugal pendulum device for damping torsional vibrations with a centrifugal pendulum flange which can be rotated about the axis of rotation and which has at least one pendulum mass which is displaceable under centrifugal force relative to the centrifugal pendulum flange, wherein the at least one pendulum mass is acted on by a friction force generated by a first friction device having a first spring and at least one first friction element;
wherein the first spring is supported on a cover of a pulley of the output part.

2. The pulley decoupler according to claim 1, wherein the first friction element is disposed in a receptacle of the cover and is guided parallel to the axis of rotation.

3. The pulley decoupler according to claim 1, wherein at least a second friction element is arranged between the at least one pendulum mass and the centrifugal pendulum flange.

4. The pulley decoupler according to claim 1, wherein the centrifugal pendulum flange is arranged between a spring flange of the input part and a hub of the pulley decoupler.

5. The pulley decoupler according to claim 1, wherein the centrifugal pendulum device is at least partially covered by a first cover cap which is fastened to a pulley of the output part.

6. The pulley decoupler according to claim 1, wherein the output part has a pulley which at least partially surrounds the centrifugal pendulum device.

7. The pulley decoupler according to claim 5, wherein the at least one pendulum mass is arranged in a centrifugal pendulum space of the centrifugal pendulum device, wherein the centrifugal pendulum space is at least partially closed by a second cover cap.

8. The pulley decoupler according to claim 7, wherein the second cover cap is connected to a second friction device, so that the second cover cap generates an axial force on the pulley decoupler.

9. The pulley decoupler according to claim 7, wherein the second cover cap is designed as a plate spring, so that the second cover cap generates an axial force on the pulley decoupler.

10. A pulley decoupler for an accessory drive, comprising:
an input part;
an output part, the output part and the input part being rotatable about a common axis of rotation and being rotatable to a limited extent relative to one another; and a centrifugal pendulum device for damping torsional vibrations with a centrifugal pendulum flange which can be rotated about the axis of rotation and which has at least one pendulum mass which is displaceable under centrifugal force relative to the centrifugal pendulum flange, wherein the at least one pendulum mass is acted on by a friction force generated by a first friction device having a first spring and at least one first friction element;

wherein the centrifugal pendulum flange is arranged between a spring flange of the input part and a hub of the pulley decoupler.

11. The pulley decoupler according to claim 10, wherein the first spring is supported on a cover of a pulley of the output part.

12. The pulley decoupler according to claim 11, wherein the first friction element is disposed in a receptacle of the cover and is guided parallel to the axis of rotation.

13. The pulley decoupler according to claim 10, wherein at least a second friction element is arranged between the at least one pendulum mass and the centrifugal pendulum flange.

14. The pulley decoupler according to claim 10, wherein the centrifugal pendulum device is at least partially covered by a first cover cap which is fastened to a pulley of the output part.

15. The pulley decoupler according to claim 14, wherein the at least one pendulum mass is arranged in a centrifugal pendulum space of the centrifugal pendulum device, wherein the centrifugal pendulum space is at least partially closed by a second cover cap.

16. The pulley decoupler according to claim 15, wherein the second cover cap is connected to a second friction device, so that the second cover cap generates an axial force on the pulley decoupler.

17. The pulley decoupler according to claim 15, wherein the second cover cap is designed as a plate spring, so that the second cover cap generates an axial force on the pulley decoupler.

18. The pulley decoupler according to claim 10, wherein the output part has a pulley which at least partially surrounds the centrifugal pendulum device.

19. A pulley decoupler for an accessory drive, comprising:
an input part;
an output part, the output part and the input part being rotatable about a common axis of rotation and being rotatable to a limited extent relative to one another; and
a centrifugal pendulum device for damping torsional vibrations with a centrifugal pendulum flange which can be rotated about the axis of rotation and which has at least one pendulum mass which is displaceable under centrifugal force relative to the centrifugal pendulum flange, wherein the at least one pendulum mass is acted on by a friction force generated by a first friction device having a first spring and at least one first friction element;

wherein the centrifugal pendulum device is at least partially covered by a first cover cap which is fastened to a pulley of the output part;

wherein the at least one pendulum mass is arranged in a centrifugal pendulum space of the centrifugal pendulum device, wherein the centrifugal pendulum space is at least partially closed by a second cover cap;

wherein the second cover cap is connected to a second friction device, so that the second cover cap generates an axial force on the pulley decoupler.

20. The pulley decoupler according to claim 19, wherein the second cover cap is designed as a plate spring.

* * * * *